(12) United States Patent
Gersten et al.

(10) Patent No.: US 11,973,406 B2
(45) Date of Patent: Apr. 30, 2024

(54) ROTOR AND ELECTRIC MOTOR WITH SUCH A ROTOR

(71) Applicant: ZF Friedrichshafen AG, Friedrichshafen (DE)

(72) Inventors: Rayk Gersten, Friedrichshafen (DE); Stefan Spühler, Friedrichshafen (DE); David Wörzler, Langenargen (DE); Martin Christians, Friedrichshafen (DE); Martin Jelinewski, Nonnenhorn (DE); Alexander Baur, Deggenhausertal (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 112 days.

(21) Appl. No.: 17/552,917

(22) Filed: Dec. 16, 2021

(65) Prior Publication Data
US 2022/0200406 A1 Jun. 23, 2022

(30) Foreign Application Priority Data
Dec. 18, 2020 (DE) ...................... 10 2020 216 237.9

(51) Int. Cl.
| | |
|---|---|
| H02K 9/197 | (2006.01) |
| H02K 1/276 | (2022.01) |
| H02K 1/32 | (2006.01) |

(52) U.S. Cl.
CPC .......... *H02K 9/197* (2013.01); *H02K 1/2766* (2013.01); *H02K 1/32* (2013.01)

(58) Field of Classification Search
CPC ........ H02K 9/197; H02K 9/19; H02K 1/2766; H02K 1/32

USPC .......................................... 310/59
See application file for complete search history.

(56) References Cited

U.S. PATENT DOCUMENTS

| | | | |
|---|---|---|---|
| 9,787,165 | B2 | 10/2017 | Buttner et al. |
| 10,461,604 | B2 | 10/2019 | Paul et al. |
| 2020/0119609 | A1 | 4/2020 | Foley et al. |

FOREIGN PATENT DOCUMENTS

| | | |
|---|---|---|
| DE | 10 2012 203 697 A1 | 9/2013 |
| DE | 10 2014 107 845 A1 | 12/2015 |
| DE | 10 2019 202 566 A1 | 8/2020 |
| JP | 2010-263696 A | 11/2010 |

OTHER PUBLICATIONS

German Search Report Corresponding to 10 2020 216 237.9 dated Aug. 18, 2021.

*Primary Examiner* — Alex W Mok
(74) *Attorney, Agent, or Firm* — Finch & Maloney PLLC

(57) ABSTRACT

A rotor (1) for an electric machine (25) which comprises a rotor support (2). The rotor support has cylindrical inner and outer shells (3, 4). A magnetic flux-carrying rotor component has first and second end faces (6, 7) and carries the cylindrical outer shell (4). A rotationally shaft section (8) is arranged in an inside space (9) of the rotor support and mounted coaxially with the rotor support. At least in the area of the first end face (6) the outer shell has first teeth which face toward the magnetic flux-carrying rotor component and a first tooth base between respective pairs of first teeth, and at least in the area of the second end face (7) the outer shell (4) has second teeth which face toward the magnetic flux-carrying rotor component and a second tooth base between respective pairs of second teeth. The invention also relates to an electric machine.

14 Claims, 5 Drawing Sheets

ROTOR AND ELECTRIC MOTOR WITH SUCH A ROTOR

This application claims priority from German Patent Application Serial No. 10 2020 216 237.9 filed on Dec. 18, 2020.

FIELD OF THE INVENTION

The invention relates to a rotor for an electric machine, the said rotor comprising a rotor support which is mounted to rotate about a rotational axis, wherein the rotational axis defines an axial direction and a radial direction that extends around the axial direction, wherein the rotor support comprises a cylindrical inner shell facing toward the rotational axis and, opposite it, a cylindrical outer shell, a magnetic flux-carrying rotor component which supports the cylindrical outer shell, wherein the said magnetic flux-carrying rotor component comprises, at its axial ends, a respective first end face and a second end face, a rotationally symmetrical shaft section, wherein the said rotationally symmetrical shaft section extends in the axial direction, and wherein the rotationally symmetrical shaft section is arranged in an inside space of the rotor support and the rotationally symmetrical shaft section is mounted coaxially with the rotor support, wherein, in a circumferential direction, the outer shell has first radial teeth at least in the area of the first end face, which teeth face toward the magnetic flux-carrying rotor component and a first tooth base in each case between respective pairs of first teeth, and wherein, in a circumferential direction, the outer shell has second radial teeth with second teeth that face toward the magnetic flux-carrying rotor component and a second tooth base in each case between respective pairs of second teeth. In addition the invention relates to an electric machine.

BACKGROUND OF THE INVENTION

Electric machines with a rotor mounted to rotate around a rotor shaft and a stator, heat up during the energy transformation from electrical into mechanical energy, and vice-versa. To increase the efficiency of such electric machines, it is necessary to cool them.

Such rotors comprise metal sheets, so-termed sheet-metal packs, by means of which a magnetic flux is produced. These rotors are in most cases operated together with a stator. By virtue of the electromagnetic activity during operation, the rotor and components around it are strongly heated. A number of possibilities are known for cooling the rotor of an electric machine in order to limit the heating and thereby improve the performance.

It is known to make the rotor supports of such electric machines in the form of hollow shafts, into and through which a coolant can flow.

DE 10 2014 107 845 A1 discloses a rotor shaft for the rotor of an electric machine, which comprises a cylindrical shell closed on both sides by end flanges, which shell surrounds a hollow shaft space, wherein on each of the end flanges a shaft journal is formed, and in one of the shaft journals an inlet is formed, through which a cooling fluid passes into the hollow shaft space and reaches the inside surface of the cylindrical shell, comprising a distributor element arranged in the hollow shaft space which receives the cooling fluid coming in through the inlet, leads it via a rotationally symmetrical deflection surface toward the inside surface of the cylindrical shell and delivers it via an outlet area onto the said inside surface.

DE 10 2012 203 697 A1 discloses a rotor for cooling an electric machine, which comprises a stator, a rotor mounted to rotate about a rotational axis, which rotor during operation co-operates magnetically with the stator, a shaft on which the rotor is fixed and which has an axial bore, and an inlet element which extends into the axial bore in such a manner that a coolant, in particular a cooling fluid, can flow out of the inlet element into the axial bore.

SUMMARY OF THE INVENTION

An objective of the present invention is to improve the cooling of the rotor of an electric machine, without taking up additional fitting space. In addition, a further objective of the invention is to indicate an electric machine with such a rotor.

These objectives are achieved by a rotor having the features specified below and by an electric machine with those features specified below.

In the subordinate claims further advantageous measures are listed, which can be suitably combined with one another to achieve further advantages.

The objective is achieved by a rotor for an electric machine which comprises a rotor support mounted to rotate about a rotational axis, such that the rotational axis defines an axial direction and a radial direction extending around the axial direction, wherein the rotor support comprises a cylindrical inner shell facing toward the rotational axis and, opposite it, a cylindrical outer shell, a magnetic flux-carrying rotor component carrying the cylindrical outer shell, such that the magnetic flux-carrying rotor component has at its respective axial ends a first end face and a second end face, a rotationally symmetrical shaft section, such that the rotationally symmetrical shaft section extends in the axial direction and the rotationally symmetrical shaft section is arranged in an inside space of the rotor support and the rotationally symmetrical shaft section is mounted coaxially with the rotor support, wherein, in a circumferential direction, at least in the area of the first end face the outer shell has first radial teeth which face toward the magnetic flux-carrying rotor component and a first tooth base between respective pairs of first teeth, wherein, in a circumferential direction, at least in the area of the second end face the outer shell has second radial teeth which face toward the magnetic flux-carrying rotor component and a second tooth base between respective pairs of second teeth, wherein the rotationally symmetrical shaft section is designed to convey a fluid to the inner shell of the rotor support, and wherein first radial outlet openings are provided in the area of the first end face in the rotor support, which are in each case arranged in the first tooth base, and which are in the form of radial perforations in the rotor support, and wherein the perforations are arranged uniformly in the circumferential direction of the rotor support so that through the said first radial outlet openings the fluid emerges in the radial direction when the rotor rotates, and wherein second radial outlet openings are provided in the area of the second end face in the rotor support, which are in each case arranged in the second tooth base, which are in the form of radial perforations in the rotor support, and wherein the perforations are arranged uniformly in the circumferential direction of the rotor support so that through the said second radial outlet openings the fluid emerges in the radial direction when the rotor rotates.

Through the rotor according to the invention the fluid, preferably oil, can flow by virtue of the first radial outlet openings and the second radial outlet openings through the rotor support in the radial direction. Thanks to the arrangement of the radial outlet openings in a tooth base (tooth root base), there is no material loss since the rotor support is thin-walled in that area.

In that way, no stresses or other problems occur during the rotation. By arranging the radial outlet openings in the tooth bases, both at the first and at the second end face, the fluid flows first for the complete or nearly complete cooling of the rotor by way of the inner shell. There, efficient cooling takes place over a large axial area of the rotor due to the fluid flowing along.

In that way, better rotor performance is achieved without structural modifications that would possibly necessitate structural modifications of the surrounding components.

It is also advantageous that the weight of the rotor remains the same while, at the same time, the efficiency of its cooling is increased.

Preferably, three first radial outlet openings and three second radial outlet openings are provided, which are distributed uniformly in the circumferential direction around the inner shell. In that way, the quantity of cooling fluid flowing through can emerge from the inside space reliably and expediently.

Preferably, the magnetic flux-carrying rotor component is in the form of a sheet-metal pack.

The fluid/cooling fluid is preferably oil or hydraulic oil.

In a further embodiment, the rotationally symmetrical shaft section has a plurality of attached extensions that face toward the inner shell of the rotor support and extend in the axial direction, wherein the said plurality of attached extensions are arranged uniformly in the circumferential direction and wherein the said plurality of attached extensions extending in the axial direction have axial attachment ducts for conveying the fluid.

Preferably, the axial attachment ducts are in the form of bores in the attached extensions.

In this case, the attached extensions are formed in such a manner that they do not touch the inner shell, or only lightly so. Also preferably, three attached extensions are distributed uniformly over an outer periphery of the rotationally symmetrical shaft section.

Furthermore, the rotationally symmetrical shaft section can have a fluid inlet and a rotationally symmetrical fluid-carrying groove for directing the fluid, as well as outlets which form a fluid connection with the attachment ducts, so that during rotation the fluid flows through the rotationally symmetrical fluid-carrying groove to the outlets and then into and through the attachment ducts.

In that way, the fluid can be delivered into the inside space of the rotor. By virtue of centrifugal force, the oil or fluid is held in the fluid-carrying groove so that no structural modifications are needed in order to convey the fluid to the outlets. Preferably, the outlets are arranged in the fluid-carrying groove.

In a further embodiment, the attached extensions and the attachment ducts extend axially as far as the axial center of the inner shell, so that fluid flowing out through the attachment ducts during rotation makes its way to the middle of the inner shell and from there it is distributed essentially uniformly to the first and second radial outlet openings.

In this context, axial center means a central area of the inner shell.

Owing to the extension of the attachment ducts to the middle, under the action of centrifugal force, the fluid flows through the outlet in the inside space of the rotor support to the inner shell of the rotor support. From there, under the action of centrifugal force, the fluid is distributed over the inner shell to the first radial outlet openings and the second radial outlet openings. Thanks to the central impingement and uniform distribution of the fluid flow over the inner shell, efficient cooling is ensured. Owing to the design of the fluid guiding system in the form of attached extensions with attachment ducts integrated therein, wherein the attached extensions are not arranged on the inner shell and are only lightly in contact with it or even not in contact at all, this uniform distribution is possible.

In another embodiment, the rotor support has on its first end face a supporting shoulder which is in the form of a radial section on the rotor support. In addition, the rotor support preferably has on its second end face a safety ring which is arranged as a radial section on the rotor support, so that the magnetic flux-carrying rotor component is fixed between the supporting shoulder and the safety ring.

In a further embodiment, the supporting shoulder has first cutouts that face toward the magnetic flux-carrying rotor component, wherein the said first cutouts extend through the supporting shoulder so that during rotation, the fluid coming from the first radial outlet openings flows out radially through the first cutouts.

Moreover, the first cutouts can each be in the form of semicircular grooves.

In that way, no drilling through the magnetic flux-carrying rotor component, usually in the form of a sheet-metal pack, is needed for the fluid to flow out radially. Furthermore, thereby the sheet-metal pack too is cooled.

Thus, only the most necessary axial fitting space is used. The cutouts are preferably in line with the corresponding radial outlet openings.

Also preferably, the safety ring has second cutouts that face toward the magnetic flux-carrying rotor component, such that the said second cutouts extend through the safety ring in the radial direction so that during rotation, the fluid coming from the second radial outlet openings flows away radially through the second cutouts.

Moreover, the second cutouts can each be in the form of semicircular grooves.

In this case too, no drilling through the magnetic flux-carrying rotor component, which is usually in the form of a sheet-metal pack, is needed for the fluid to flow away radially. Furthermore, the sheet-metal pack too is cooled.

Thus, only the most necessary axial fitting space is used. The cutouts are preferably aligned with the corresponding radial outlet openings.

Also preferably, on the first end face of the magnetic flux-carrying rotor component there is arranged a first fluid guiding disk which is positioned after the supporting shoulder in the radial direction, so that the fluid flowing through the cutouts in the supporting shoulder during rotation flows along the first fluid guiding disk, and on the second end face of the magnetic flux-carrying rotor component there is arranged a second fluid guiding disk which is positioned after the safety ring in the radial direction, so that the fluid flowing through the cutouts in the safety ring during rotation flows along the second fluid guiding disk.

In this case, the fluid guiding disks can be made as oil sheets. By virtue of the said fluid guiding disks simpler and more expedient transport of the fluid in the radial direction due to centrifugal force during the rotation of the rotor is possible.

Also preferably, the first fluid guiding disk is made of a non-conductive material or has a non-conductive coating, and/or the second fluid guiding disk is made of a non-conductive material or has a non-conductive coating. In that way, these do not co-operate with the magnetic flux-carrying rotor component, not does it co-operate with them.

In a further embodiment, the first fluid guiding disk has radially at its end a first annular section that faces away from the magnetic flux-carrying rotor component.

Likewise, the second fluid guiding disk can have radially at its end a second annular section that faces away from the magnetic flux-carrying rotor component. Thanks to these axial projections, the fluid can flow down onto the winding heads of the stator. Thus, the winding heads are wetted over as large a diameter as possible, but with a corresponding distance to surrounding insulated components.

Furthermore, the stated objective is achieved with an electric machine comprising a stator and a rotor as described above that can rotate relative to the stator. Thanks to the rotor according to the invention, the fluid can therefore be used not only for the primary cooling of the rotor but also for the secondary cooling of the stator, in particular its winding heads. This enables particularly effective cooling of the electric machine as a whole.

BRIEF DESCRIPTION OF THE DRAWINGS

Further features, properties and advantages of the present invention emerge from the description given below, with reference to the attached figures which show, in each case schematically.

DETAILED DESCRIPTION OF THE PREFERRED EMBODIMENTS

Figure 1:
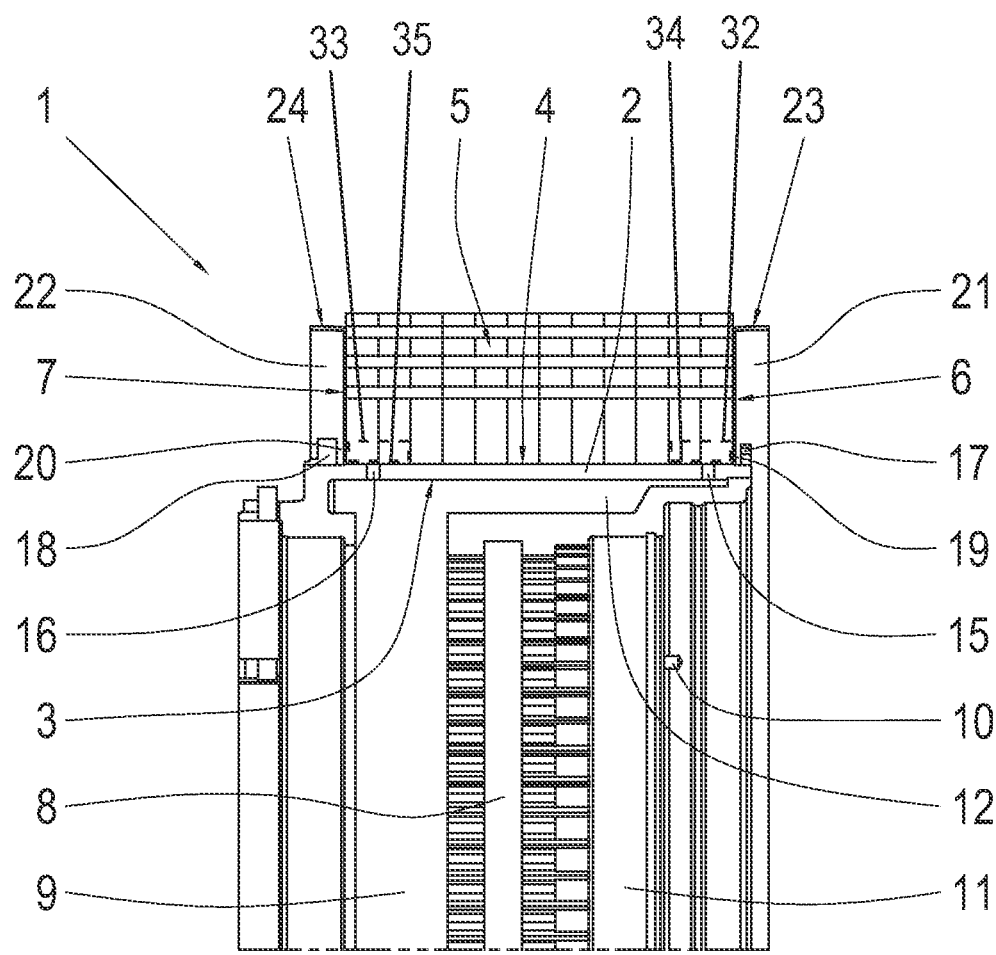
FIG. 1: A rotor according to the invention.
Figure 1:
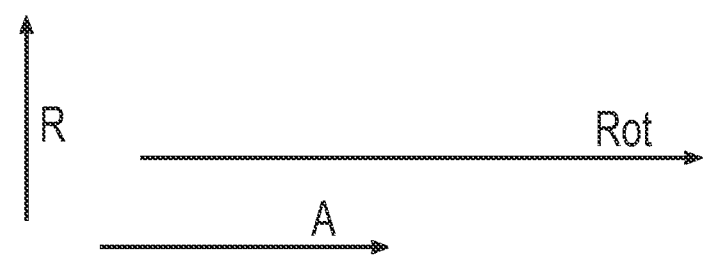

FIG. 1 shows a rotor 1 according to the prior art for an electric machine 2. The rotor 1 is mounted to rotate rotationally symmetrically about a rotational axis Rot. The rotational axis Rot defines an axial direction A. The radial direction R extends radially around the rotational axis Rot and the axial direction A.

The rotor 1 comprises a rotor support 2, which is also mounted to rotate about the rotational axis Rot. The rotor support 2 is preferably of cylindrical, in particular hollow-cylindrical, form and has an inside space 9. Moreover, the rotor support extends along the axial direction A.

The rotor support 2 has a cylindrical inner shell 3 that faces toward the rotational axis Rot and, opposite it, a cylindrical outer shell 4.

Furthermore, a magnetic flux-carrying component is provided, in this case in the form of a sheet-metal pack 5, which is arranged on the outer shell 4. The sheet-metal pack 5 can consist of axially stacked sheet-metal lamellae.

The sheet-metal pack 5 has a first end face 6 and a second end face 7 at its respective ends.

In addition, as shown diagrammatically with dashed lines in FIG. 1, radial teeth 32, 33 are formed, in the area of the first end face 6 and in the area of the second end face 7, to increase the torque resistance.

This means that at least in the area of the first end face 6, the outer shell 4 has first teeth 32 in a circumferential direction U (FIG. 2), the said first teeth 32 facing toward the sheet-metal pack 5, and also a first tooth base 34 between respective pairs of first teeth 32.

Moreover, at least in the area of the second end face 7, the outer shell 4 has second teeth 33 in a circumferential direction U (FIG. 2), the said second teeth 33 facing toward the sheet-metal pack 5, and also a second tooth base 35 between respective pairs of second teeth 33.

To produce a rotary connection with other components and to mount the rotor 1 and the rotor support 2, the rotor support 2 can have at its end a radial section (not shown).

The rotor 1 also has a rotor hub, which comprises a rotationally symmetrical shaft section 8. This extends in the axial direction A. The rotationally symmetrical shaft section 8 is arranged in the inside space 9 of the rotor support 2.

Furthermore, the rotationally symmetrical shaft section 8 is mounted coaxially relative to the rotor support 2.

The rotor 1 is at least partially arranged in a housing (not shown). In this case, the housing is designed to guide oil to the rotationally symmetrical shaft section 8.

The rotationally symmetrical shaft section 8 also has a fluid inlet 10 for admitting the oil from the housing (not shown).

Moreover, a rotationally symmetrical fluid-carrying groove 11 is provided, in the rotationally symmetrical shaft section 8, into which the oil coming in through the fluid inlet 10 flows. When the rotor 1 rotates, on the one hand the oil is held in the rotationally symmetrical fluid-carrying groove 11 and, on the other hand, it is distributed in the rotationally symmetrical fluid-carrying groove 11.

Furthermore, the rotationally symmetrical shaft section 8 has a plurality of attached extensions 12, preferably three, that face toward the inner shell 3 of the rotor support 2 and extend in the axial direction A. The said plurality of attached extensions extending in the axial direction A have axial attachment ducts 13.

Figure 2:
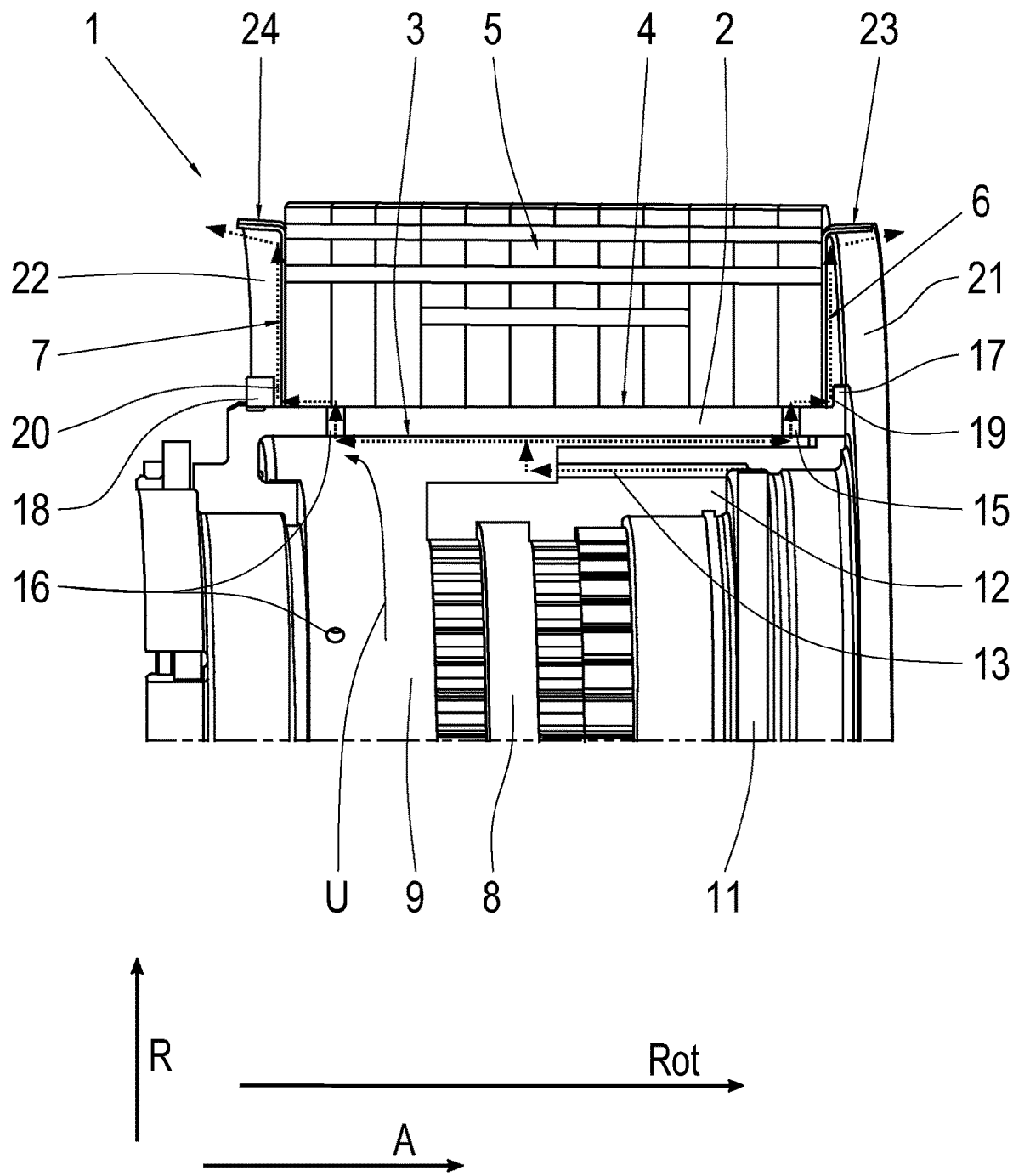
FIG. 2: The rotor in operation.
Figure 3:
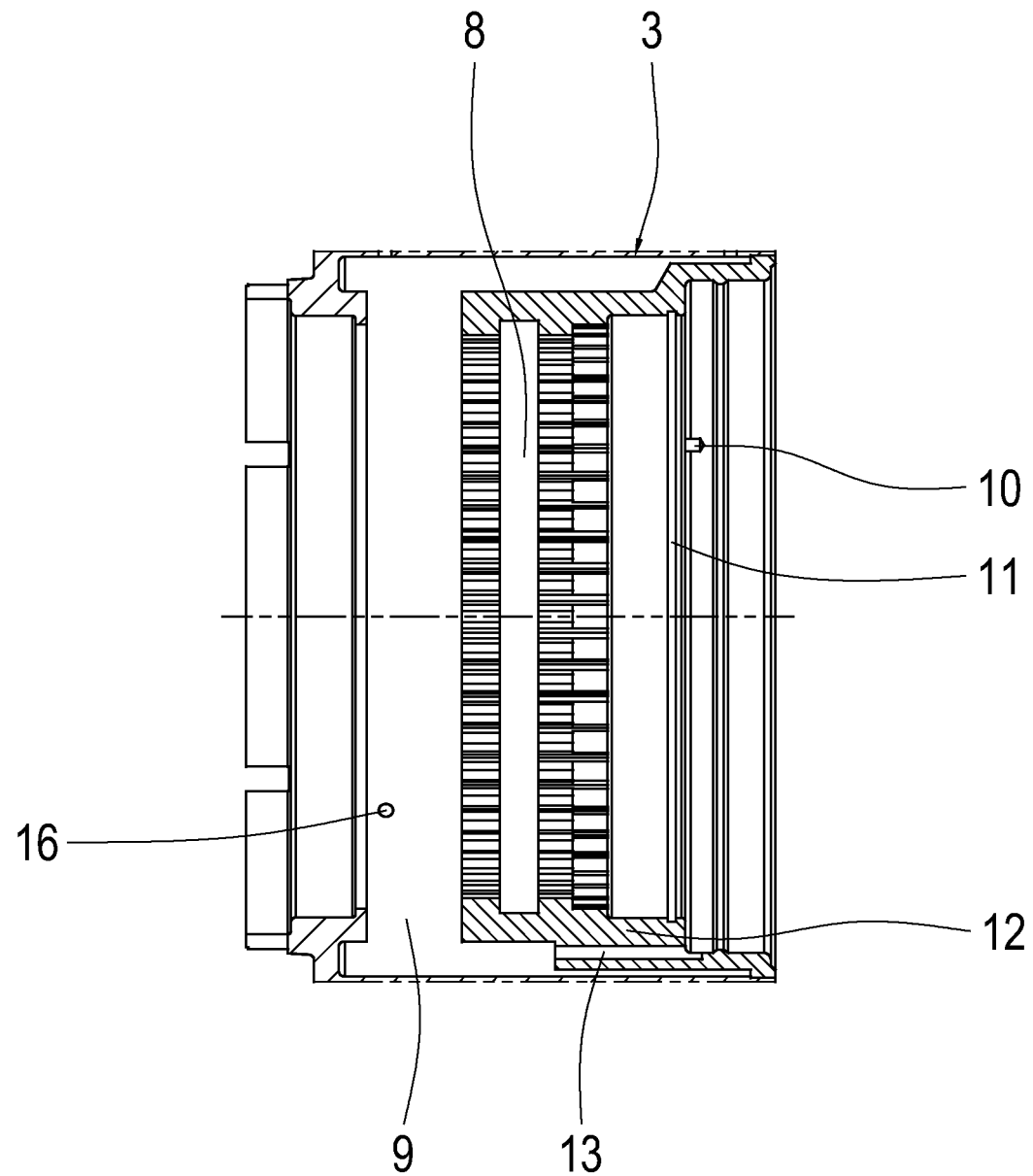
FIG. 3: A rotationally symmetrical shaft section with an attachment duct.

FIG. 3 shows these attachment ducts 13, viewed in cross-section, in detail. The attached extensions 12 are arranged uniformly in the circumferential direction U (FIG. 2) around the outside of the rotationally symmetrical shaft section 8. The attachment ducts 13, extending in the axial direction A, are preferably formed as bores. The attachment ducts 13 are open toward the inside space 9 of the rotor support 2.

Alternatively, the attached extensions 12 can also be in the form of a single ring-shaped attachment in which the attachment ducts 13 are formed uniformly in the circumferential direction U (FIG. 2).

Figure 4:
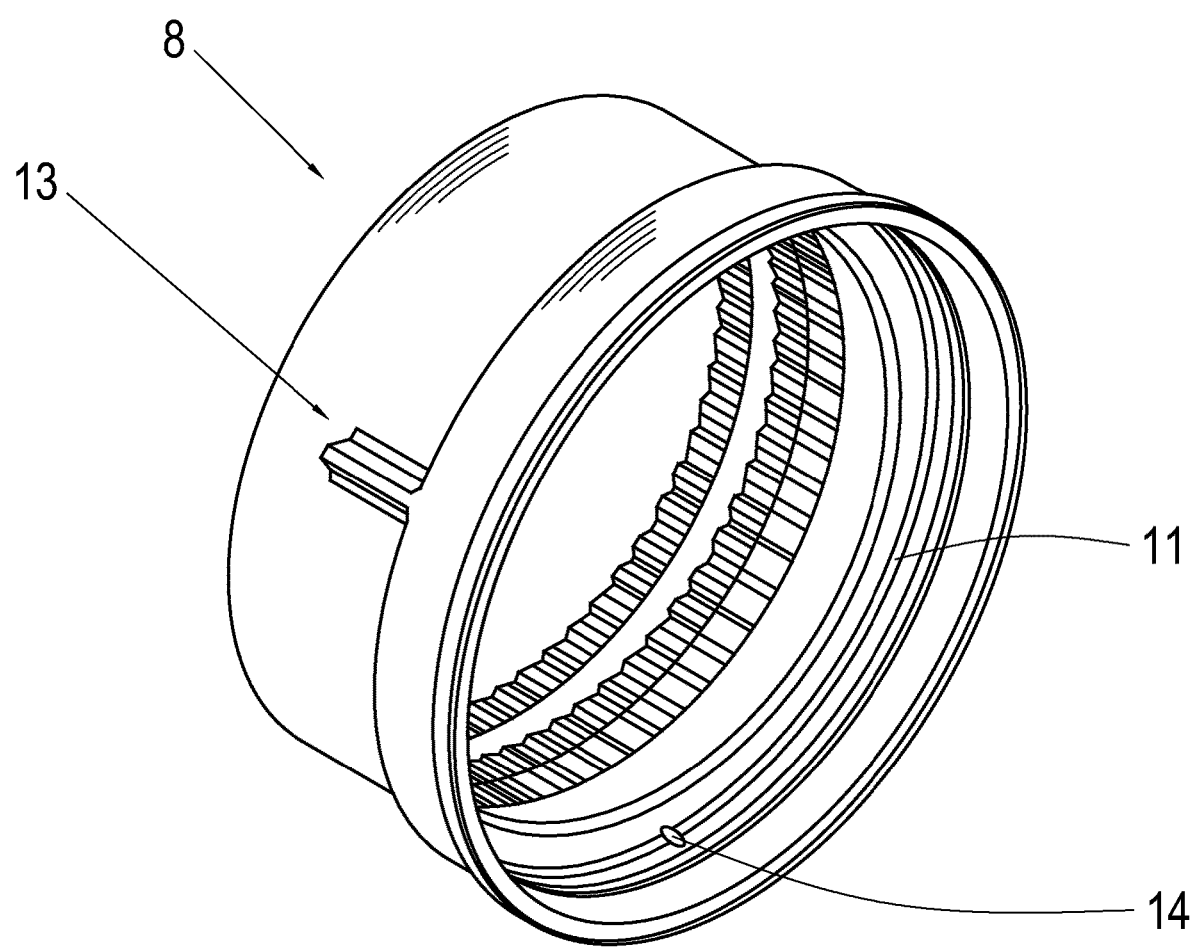
FIG. 4: The rotationally symmetrical shaft section with an attached extension extending in the axial direction.

FIG. 4 shows, in detail, the rotationally symmetrical shaft section 8 with the attached extensions 12 extending in the axial direction A.

Preferably, three attached extensions 12 are provided, which extend in the axial direction A.

In addition, the rotationally symmetrical fluid-carrying groove 11 also has outlets 14, by means of which a fluid connection is formed between the rotationally symmetrical fluid-carrying groove 11 and the attachment ducts 13.

During rotation, the oil held in the fluid-carrying groove 11 is transported by virtue of the rotation to the outlets 14 and flows through them into the attachment ducts 13.

Preferably, in the axial direction A the attachment ducts end in a central area of the rotor support 2, i.e., axially in the middle of the rotor support 2.

In this case, the said central area corresponds approximately to the axial middle of the rotor support 2, so that the first end face 6 and the second end face 7 are axially the same distance away.

The attachment ducts 13 are open at their ends, so that oil can flow out of them into the inside space 9.

By virtue of the centrifugal force produced by the rotation of the rotor 1, the outflowing oil flows to the inner shell 3 and to the middle of the inner shell 3.

Since the attachment ducts 13 end axially in the middle or central area of the rotor support 2, the oil flows to the axially central area of the inner shell 3. Owing to the rotation of the rotor 1 and the impingement of the oil on the axial center of the inner shell 3, the oil then flows along essentially uniformly to both sides of the inner shell 3, i.e., the oil flow spreads uniformly over the inner shell 3.

This results in uniform cooling of the rotor 1.

As FIG. 1 also shows, first radial outlet openings 15 are provided in the rotor support 2 in the area of the first end face 5, which are in each case arranged in the first tooth base and which are in the form of radial perforations in the rotor support 2.

Thus, the said first radial outlet openings 15 are, for example, in the form of bores which extend from the inner shell 3 through a first tooth base. By way of the first radial outlet openings 15, oil can flow through the rotor support 2 in the radial direction R.

Thanks to the arrangement in a tooth base, no material loss occurs, since the rotor support 2 is thin-walled in that area. At the same time, the oil flows almost over the whole of the inner shell 3 so that the rotor 1 is cooled completely or almost completely.

Preferably three first radial outlet openings 15 are provided, which are distributed in the circumferential direction U (FIG. 2) uniformly around the inner shell 3.

FIG. 1 also shows further, second radial outlet openings 16, which are arranged in the rotor support 2 in the area of the second end face 7. These are located in a second tooth base and are also in the form of radial perforations, the said perforations being arranged uniformly in the circumferential direction U of the inner shell 3. Thus, the second radial outlet openings 16 are, for example, in the form of bores that extend from the inner shell 3 through a second tooth base. By virtue of the second radial outlet openings 16, the fluid can flow through in the radial direction R when the rotor 1 is rotating.

Thanks to the arrangement in a tooth base, again no material loss occurs in the area of the second end face 7, since the rotor support 2 is thin-walled in that area. At the same time, the oil flows almost over the whole of the inner shell 3 so that the rotor 1 is cooled completely or almost completely.

Preferably three second radial outlet openings 16 are provided, which are distributed uniformly in the circumferential direction U (FIG. 2) around the inner shell 3.

As FIG. 1 also shows, the rotor support 2 has a supporting shoulder 17 on the first end face 6 which is arranged as a radial section on the inner shell 3. The inner shell 3 and the supporting shoulder 17 can be made integrally, as one piece.

In addition, the rotor support 2 has a safety ring 18, on the second end face 7, which is also in the form of a radial section on the inner shell 3.

Thus, the safety ring 18 and the supporting shoulder 17 can secure the sheet-metal pack 5 axially.

Furthermore, the supporting shoulder 17 has first cutouts 19 that face toward the sheet-metal pack 5, such that the first cutouts 19 extend through the supporting shoulder 17 in the radial direction R.

Preferably three first cutouts 19 are provided, which correspond to the first radial outlet openings 15.

In that way the oil, which flows through the first radial outlet openings 15, can flow on to and through the first cutouts 19.

The first cutouts 19 and the first radial outlet openings 15 can be arranged not aligned with one another. With a non-aligned arrangement, by virtue of the rotation movement the oil flowing through the first radial outlet openings 15 flows along the outer shell 4 of the rotor support 2 and then through the first cutouts 19.

A first cutout 19 can, in this case, be in the form of a radially through-going semicircular groove. Moreover, the first cutouts 19 can be in the form of perforations or bores open toward the sheet-metal pack 5.

Furthermore, the safety ring 18 has second cutouts 20 facing toward the sheet-metal pack 5, these second cutouts extending in the radial direction R through the safety ring 18.

In that way, the oil flowing through the second radial outlet openings 16 during rotation can flow on through the second cutouts 20.

The second cutouts 20 and the second radial outlet openings 16 can be arranged not aligned with one another. With a non-aligned arrangement, by virtue of the rotation movement the oil flowing through the second radial outlet openings 16 can flow along the outer shell 4 of the rotor support 2 and then through the second cutouts 20.

A second cutout 20 can be in the form of a radially through-going semicircular groove. Moreover, the second cutouts 20 can be in the form of perforations or bores open toward the sheet-metal pack 5.

Furthermore, a first fluid guiding disk, in this case in the form of a first oil disk 21, is arranged on the first end face 6 of the sheet pack 5, which disk is positioned after the supporting shoulder 17 in the radial direction R. This means that the first oil disk 21 is arranged axially on the sheet-metal pack 5, so that during rotation, the fluid flowing through the first cutouts 19 in the supporting shoulder 17 flows along the first oil disk 21.

Moreover, the first oil guiding disk 21 has a first annular section 23 facing away from the sheet-metal pack 5. Thus, this corresponds as it were to a ring-shaped projection in the axial direction A. Radially at the end, i.e., facing away from the supporting shoulder 17, the first annular section 23 is arranged on the first oil guiding disk 21. By virtue of the rotation movement, i.e., the centrifugal force produced thereby, oil flowing through the supporting shoulder 17 is thus, is made to flow in the radial direction R along the first oil guiding disk 21 and is discharged in the axial direction A through the first annular section 23. Due to the centrifugal forces acting on the oil discharged in the axial direction A, the discharged oil then flows in the radial direction R.

Figure 5:
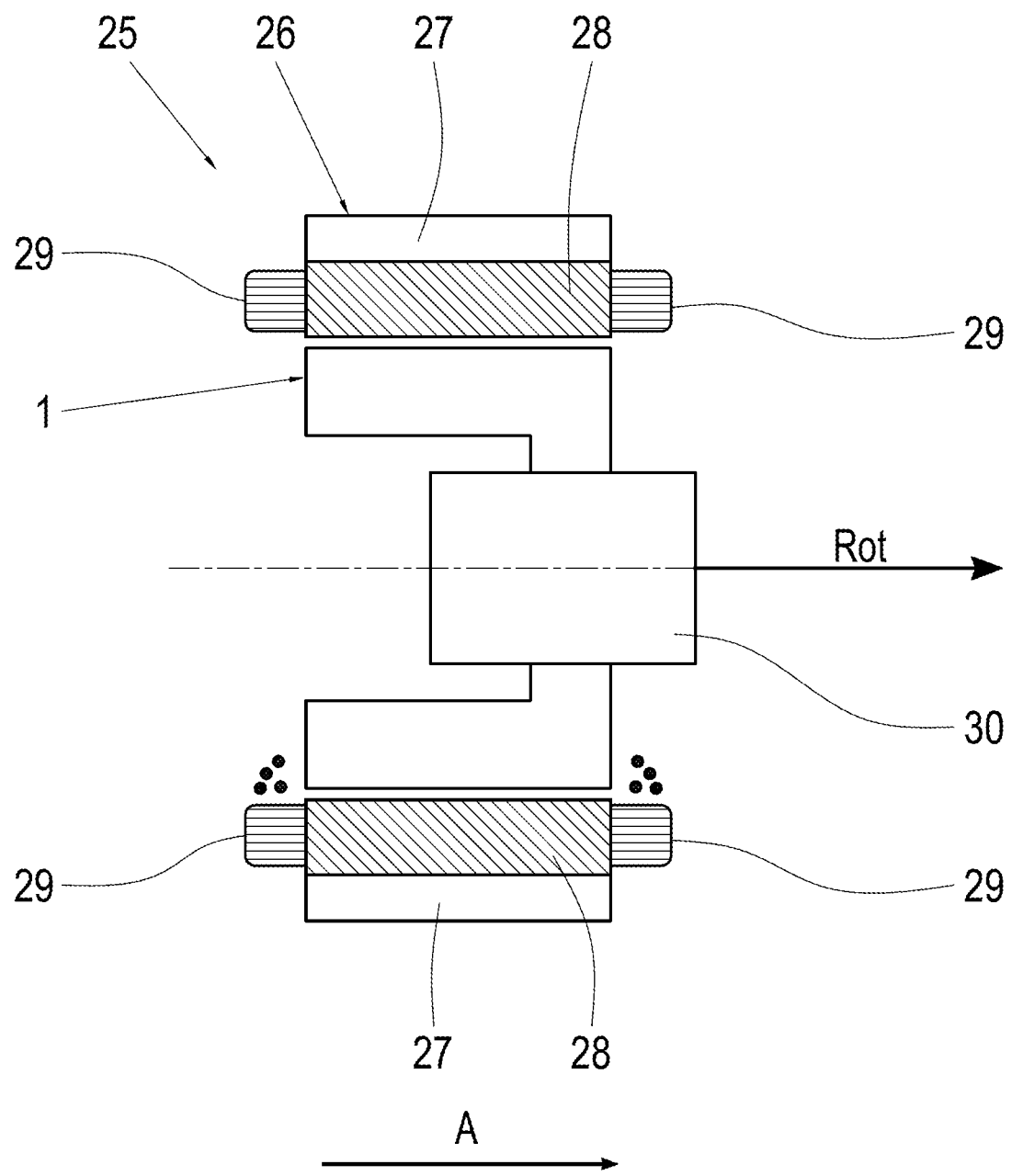
FIG. 5: An electric machine.

There, the oil impinges on one of the two winding heads 29 (FIG. 5) of a stator 26 (FIG. 5) and cools it. Thus, the oil acts not only for the primary cooling of the rotor 1 but also for the secondary cooling of the two winding heads 29 (FIG. 5) of the stator (FIG. 5).

Furthermore, by virtue of this rotor 1, according to the invention, the winding heads 29 (FIG. 5) are wetted, while an appropriate distance to insulated parts or components can be maintained.

In addition, a second fluid guiding disk, here in the form of a second oil guiding disk 22, is arranged on the second end face 7 of the sheet-metal pack 5, which disk is positioned after the safety ring 18 in the radial direction R. This means that the second oil guiding disk 22 is arranged axially on the sheet-metal pack 5 so that, during rotation, fluid flowing in through the second cutouts 20 in the safety ring 18, then flows along the second oil guiding disk 22.

Moreover, the second oil guiding disk 22 has a second annular section 24 that faces away from the sheet-metal pack 5. Thus, this corresponds as it were to a ring-shaped projection in the axial direction A. The second annular section 24 is arranged radially at the end on the second oil guiding disk 22, i.e., facing away from the safety ring 18.

Owing to the rotation movement, i.e., the centrifugal forces produces thereby, oil flowing in through the safety ring 18 is thus made to flow in the radial direction R along the second oil guiding disk 22 and is discharged in the axial direction A. Due to the centrifugal forces acting on the oil discharged in the axial direction A, the discharged oil then flows in the radial direction R.

There, the oil impinges on the other of the two winding heads 29 (FIG. 5) of the stator 26 (FIG. 5) and cools it. Thus, the oil acts not only for the primary cooling of the rotor 1 but also for the secondary cooling of the two winding heads 29 (FIG. 5) of the stator (FIG. 5).

Furthermore, by virtue of this rotor 1, according to the invention, the winding heads 29 (FIG. 5) are wetted while an appropriate distance to insulated parts or components can be maintained.

In this case, the first oil guiding disk 21 and the second oil guiding disk 22 are preferably made identically.

Moreover, the first oil guiding disk 21 and the second oil guiding disk 22 are made of a non-conductive material or have a non-conductive coating.

FIG. 2 shows the rotor 1 in operation.

Through a housing (not shown), oil or some other cooling fluid flows through the fluid inlet 10 (FIG. 3) of the rotationally symmetrical shaft section 8 into the fluid-carrying groove 11 of the rotationally symmetrical shaft section 8. Owing to the rotation, by which so-termed centrifugal forces are produced, on the one hand the oil remains in the fluid-carrying groove 11 and, on the other hand, it is conveyed by it to the attached extensions 12 arranged on the rotationally symmetrical shaft section 8.

Preferably, three such attached extensions 12 are provided, which are distributed uniformly in the circumferential direction U. By virtue of the outlets 14 (FIG. 4), the oil flows into the axial attachment ducts 13 integrated in the attached extensions 12, the said axial attachment ducts 13 extending to the middle of the inner shell 3 of the rotor support 2. The oil flows through the axial attachment ducts 13 into the inside space 9 of the rotor support 2.

By virtue of centrifugal force, the oil flows to the central area of the inner shell 3 of the rotor support 2. From there it is distributed uniformly over the inner shell 3 in both directions, i.e., to the first end face 6 and to the opposite, second end face 7.

Through first radial outlet openings 15, the oil flows in the area of the first end face 6 through the inner shell 3 and into a first tooth base. Preferably, three such first radial outlet openings 15 are provided.

Through second radial outlet openings 16, the oil flows in the area of the second end face 7 through the inner shell 3 and into a second tooth base. Preferably, three such second radial outlet openings 16 are provided.

Thereafter, the oil that flowing in through the first radial outlet openings 15 flows over the outer shell 4 due to centrifugal force, to the first cutouts 19 in the supporting shoulder 17. Through the first cutouts 19 in the supporting shoulder 17, the oil can flow radially through the supporting shoulder 17 to the first oil guiding disk 21.

By virtue of the centrifugal forces, the oil is made to flow radially along the first oil guiding disk 21, in order finally to be axially discharged or flow away through the first annular section 23. Owing to the rotation, the oil wets one of the winding heads 29 (FIG. 5) of the stator 26 (FIG. 5).

Moreover, the oil flowing in through the second radial outlet openings 16 flows over the outer shell 4 under the action of centrifugal force, to the second cutouts 20 in the safety ring 18.

Through the cutouts 20 in the safety ring 18, the oil can flow through the safety ring 18 to the second oil guiding disk 22.

By virtue of centrifugal forces, the oil is made to flow radially along the second oil guiding disk 22, in order finally to be discharged or flow away through the second annular section 23. Owing to the rotation, the oil wets the winding heads 29 (FIG. 5) of the stator 26 (FIG. 5).

The transfer to the first oil guiding disk 21 and the second oil guiding disk 22 is designed such that only minimal axial fitting space is needed. This means, in particular, that the first cutouts 18 and the second cutouts 20 are made as small as possible.

Thus, the oil acts not only for the primary cooling of the rotor 1 but also for the secondary cooling of the two winding heads 29 (FIG. 5) of the stator (FIG. 5).

The rotor 1, according to the invention, does not need any additional axial fitting space.

Furthermore, a positive balance by means of weights in already existing openings is possible, since all the previous openings are still present.

FIG. 5 shows an electric machine 25 according to the invention. This has a stator 26 with a stator yoke 27. The stator 26 has stator grooves (not shown) with windings 28, which in each case form winding heads 29 at the ends. The electric machine 25 also comprises the rotor 1 according to the invention, which is mounted to rotate about the rotational axis Rot. This can drive a transmission 30.

The stator 26 and the rotor 1 are mounted coaxially with one another.

INDEXES

1 Rotor
2 Rotor support
3 Inner shell
4 Outer shell
5 Sheet-metal pack
6 First end face
7 Second end face
8 Shaft section
9 Inside space
10 Fluid inlet
11 Fluid-carrying groove
12 Attached extensions
13 Axial attachment ducts
14 Outlets
15 First radial outlet openings
16 Second radial outlet openings
17 Supporting shoulder
18 Safety ring
19 First cutout 20 Second cutout
21 First oil guiding disk
22 Second oil guiding disk
23 First annular section
24 Second annular section
25 Electric machine
26 Stator
27 Stator yoke
28 Winding
29 Winding head
30 Transmission

The invention claimed is:

1. A rotor for an electric machine comprising:
a rotor support which is mounted to rotate about a rotational axis, which axis defines an axial direction and a radial direction that extends around the axial direction,
wherein the rotor support has a cylindrical inner shell facing toward the rotational axis and a cylindrical outer shell opposite the cylindrical inner shell,
a magnetic flux-carrying rotor component which the cylindrical outer shell supports,
the magnetic flux-carrying rotor component has a first end face at one axial end thereof and a second end face at an axially opposite end thereof,
a rotationally symmetrical shaft section, the rotationally symmetrical shaft section extends in the axial direction and the rotationally symmetrical shaft section is arranged in an inside space of the rotor support, and the rotationally symmetrical shaft section is mounted coaxially with the rotor support,
in a circumferential direction, at least in an area of the first end face, the cylindrical outer shell has radial first teeth, which radial first teeth face toward the magnetic flux-carrying rotor component, and a first tooth base between respective pairs of the radial first teeth,
in a circumferential direction, at least in an area of the second end face, the cylindrical outer shell has radial second teeth, which radial second teeth face toward the magnetic flux-carrying rotor component, and a second tooth base between respective pairs of the radial second teeth,
the rotationally symmetrical shaft section is designed to convey a fluid to the cylindrical inner shell of the rotor support,
first radial outlet openings are provided in the area of the first end face in the rotor support, which first radial outlet openings are arranged in each case in the first tooth base, and which are in the form of radial perforations in the rotor support,
the radial perforations are arranged uniformly in the circumferential direction of the rotor support so that when the rotor is rotating, the fluid emerges through the first radial outlet openings in the radial direction,
second radial outlet openings are provided in the area of the second end face in the rotor support, which second radial outlet openings are arranged in each case in the second tooth base, and which are in the form of further radial perforations in the rotor support, and
the further radial perforations are arranged uniformly in the circumferential direction of the rotor support so that when the rotor is rotating, the fluid emerges through the second radial outlet openings in the radial direction.

2. The rotor according to claim 1, wherein the rotationally symmetrical shaft section comprises a plurality of attached extensions that face toward the cylindrical inner shell of the rotor support and extend in the axial direction, the plurality of attached extensions are arranged uniformly in the circumferential direction and the plurality of attached extensions, extending in the axial direction, have axial attachment ducts for conveying fluid.

3. The rotor according to claim 2, wherein the rotationally symmetrical shaft section comprises a fluid inlet and a rotationally symmetrical fluid-carrying groove for conveying the fluid, and outlets which form a fluid connection to the axial attachment ducts, so that during rotation the fluid flows through, via the rotationally symmetrical fluid-carrying groove, to the outlets and then into and through the axial attachments ducts.

4. The rotor according to claim 2, wherein the plurality of attached extensions and the plurality of attachment ducts extend axially to an axial center of the cylindrical inner shell so that, during rotation, fluid flowing out of the axial attachment ducts flows to a middle of the cylindrical inner shell and spreads essentially uniformly from there to the first radial outlet openings and to the second radial outlet openings.

5. The rotor according to claim 1, wherein the rotor support has a supporting shoulder, at the first end face, which is in the form of a radial section on the rotor support, and
the rotor support has a safety ring at the second end face which is arranged in the form of a further radial section on the rotor support so that the magnetic flux-carrying rotor component is fixed between the supporting shoulder and the safety ring.

6. The rotor according to claim 5, wherein the supporting shoulder has first cutouts that face toward the magnetic flux-carrying rotor component, the first cutouts extend in the radial direction through the supporting shoulder so that, during rotation, the fluid coming from the first radial outlet openings flows away radially by way of the first cutouts.

7. The rotor according to claim 6, wherein each of the first cutouts is in the form of a semicircular groove.

8. The rotor according to claim 5, wherein the safety ring has cutouts that face toward the magnetic flux-carrying rotor component, the cutouts extend in the radial direction through the safety ring so that, during rotation, the fluid coming from the second radial outlet openings flows away radially by way of the cutouts.

9. The rotor according to claim 8, wherein each of the cutouts is in the form of a semicircular groove.

10. The rotor according to claim 5, wherein a first fluid guiding disk is arranged on the first end face of the magnetic flux-carrying rotor component which is positioned after the supporting shoulder in the radial direction, so that the fluid which, during rotation, comes through first cutouts in the supporting shoulder flows along the first fluid guiding disk, and
a second fluid guiding disk is arranged on the second end face of the magnetic flux-carrying rotor component, which is positioned after the safety ring in the radial direction, so that the fluid which, during rotation, comes through second cutouts in the safety ring flows along the second fluid guiding disk.

11. The rotor according to claim 10, wherein at least one of:
the first fluid guiding disk comprises a non-conductive material or has a non-conductive coating, and/or
the second fluid guiding disk comprises a non-conductive material or has a non-conductive coating.

12. The rotor according to claim 10, wherein the first fluid guiding disk has a first annular section, radially at an end thereof, that faces away from the magnetic flux-carrying rotor component.

13. The rotor according to claim 10, wherein the second fluid guiding disk has a second annular section, radially at an end thereof, that faces away from the magnetic flux-carrying rotor component.

14. An electric machine comprising a stator and the rotor according to claim 1 which is rotatable relative to the stator.

\* \* \* \* \*